US011025557B2

(12) United States Patent
Thiel et al.

(10) Patent No.: US 11,025,557 B2
(45) Date of Patent: Jun. 1, 2021

(54) NETWORK PATH REDIRECTION

(71) Applicant: Microsoft Technology Licensing, LLC, Redmond, WA (US)

(72) Inventors: Gregory Irving Thiel, Black Diamond, WA (US); Konstantin E. Ryvkin, Bellevue, WA (US); Timothy Mark Moore, Bellevue, WA (US); Todd Carlyle Luttinen, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 23 days.

(21) Appl. No.: 16/666,078

(22) Filed: Oct. 28, 2019

(65) Prior Publication Data

US 2021/0126870 A1    Apr. 29, 2021

(51) Int. Cl.
| | |
|---|---|
| *H04W 36/22* | (2009.01) |
| *H04L 12/911* | (2013.01) |
| *H04L 12/853* | (2013.01) |
| *H04L 12/927* | (2013.01) |
| *H04L 12/801* | (2013.01) |
| *H04L 12/851* | (2013.01) |

(52) U.S. Cl.
CPC .......... *H04L 47/726* (2013.01); *H04L 47/12* (2013.01); *H04L 47/2416* (2013.01); *H04L 47/2433* (2013.01); *H04L 47/805* (2013.01)

(58) Field of Classification Search
CPC .. H04L 47/10; H04W 28/02; H04W 28/0205; H04W 28/021; H04W 28/0247; H04W 28/0252; H04W 28/0257; H04W 28/0263; H04W 28/0268; H04W 28/0273
USPC ........................................................ 370/235
See application file for complete search history.

(56) References Cited

U.S. PATENT DOCUMENTS

| | | | | |
|---|---|---|---|---|
| 6,647,265 | B1 * | 11/2003 | Olofsson | H04L 47/803 455/445 |
| 7,715,312 | B2 * | 5/2010 | Khasnabish | H04L 45/24 370/230 |
| 8,601,155 | B2 | 12/2013 | Toombs et al. | |

(Continued)

FOREIGN PATENT DOCUMENTS

| | | |
|---|---|---|
| WO | 2009126829 A2 | 10/2009 |
| WO | 2018234847 A1 | 12/2018 |

OTHER PUBLICATIONS

"Making Intelligent Network Automation a Reality with Advanced Analytics", In White Paper of Ciena, Retrieved on Aug. 2, 2019, 8 Pages.

(Continued)

*Primary Examiner* — Robert J Lopata
(74) *Attorney, Agent, or Firm* — Alleman Hall Creasman & Tuttle LLP

(57) ABSTRACT

A method for directing network traffic includes, at a network device, receiving network traffic provided by one or more client computing devices. The network device directs the network traffic to a service entity over a first network path. A path quality indicator is received that indicates whether the network traffic directed over the first network path satisfies one or more experience criteria. Based at least on the path quality indicator indicating that the network traffic directed over the first network path does not satisfy the one or more experience criteria, the network device redirects some or all of the network traffic to the service entity over a second network path.

20 Claims, 6 Drawing Sheets

(56) References Cited

U.S. PATENT DOCUMENTS

| | | | |
|---|---|---|---|
| 8,805,382 B2 | 8/2014 | Rahman et al. | |
| 10,045,276 B2 | 8/2018 | Chou et al. | |
| 10,212,088 B2 | 2/2019 | Laberge et al. | |
| 2004/0072571 A1* | 4/2004 | Halonen | H04W 72/082 455/450 |
| 2004/0081134 A1* | 4/2004 | Kotzin | H04W 28/16 370/348 |
| 2006/0271658 A1 | 11/2006 | Beliles et al. | |
| 2013/0033978 A1 | 2/2013 | Eckert et al. | |
| 2013/0051236 A1* | 2/2013 | Bush | H04L 45/302 370/237 |
| 2013/0343174 A1 | 12/2013 | Guichard et al. | |
| 2014/0160939 A1* | 6/2014 | Arad | H04L 45/306 370/237 |
| 2015/0124601 A1* | 5/2015 | Li | H04W 36/26 370/230 |
| 2015/0281004 A1 | 10/2015 | Kakadia et al. | |
| 2016/0080280 A1 | 3/2016 | Ramachandran et al. | |
| 2016/0197808 A1* | 7/2016 | Popokh | H04L 41/5038 370/248 |
| 2017/0135009 A1* | 5/2017 | Ling | H04L 1/0023 |
| 2017/0250855 A1 | 8/2017 | Patil et al. | |
| 2018/0069786 A1* | 3/2018 | Lokman | H04L 45/48 |
| 2018/0219749 A1 | 8/2018 | Bugenhagen et al. | |
| 2018/0278496 A1 | 9/2018 | Ramachandran et al. | |
| 2018/0287907 A1 | 10/2018 | Kulshreshtha et al. | |
| 2019/0306229 A1 | 10/2019 | Lau et al. | |
| 2020/0413284 A1* | 12/2020 | Vargantwar | H04W 72/0453 |

OTHER PUBLICATIONS

Benson, et al., "Ride: A Resilient IoT Data Exchange Middleware Leveraging SDN and Edge Cloud Resources", In Proceedings of IEEE/ACM 3rd International Conference on Internet-of-Things Design and Implementation, Apr. 17, 2018, 12 Pages.

Cooney, Michael, "Cisco wil use AI/ML to Boost Intent-based Networking", Retrieved From https://www.arnnet.com.au/article/662544/cisco-wil-use-ai-ml-boost-intent-based-networking/, Jun. 5, 2019, 10 Pages.

Mizrahi, et al., "Network Telemetry Solutions for Data Center and Enterprise Networks", In White Paper of Marvell, Mar. 2018, 14 Pages.

N, Rajesh, "Unified Network Telemetry with Anuta ATOM", Retrieved From https://www.anutanetworks.com/unified-network-telemetry-with-anuta-atom/, Aug. 17, 2018, 9 Pages.

Tran, Tino, "Measuring CloudFront Performance", Retrieved From https://aws.amazon.com/blogs/networking-and-content-delivery/measuring-cloudfront-performance/, May 25, 2018, 7 Pages.

"International Search Report and Written Opinion Issued in PCT Application No. PCT/US20/056220", dated Jan. 26, 2021, 13 Pages.

"International Search Report and Written Opinion Issued in PCT Application No. PCT/US20/056221", dated Jan. 29, 2021, 15 Pages.

\* cited by examiner

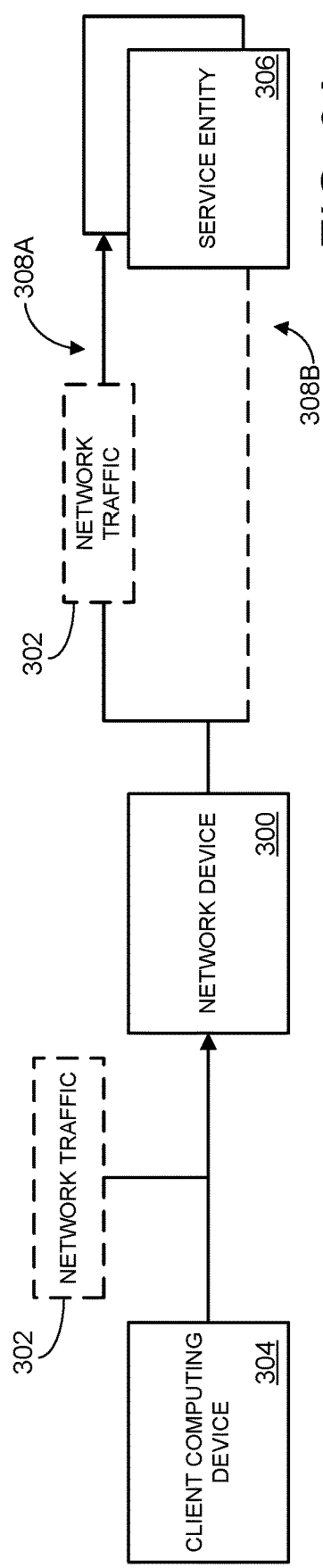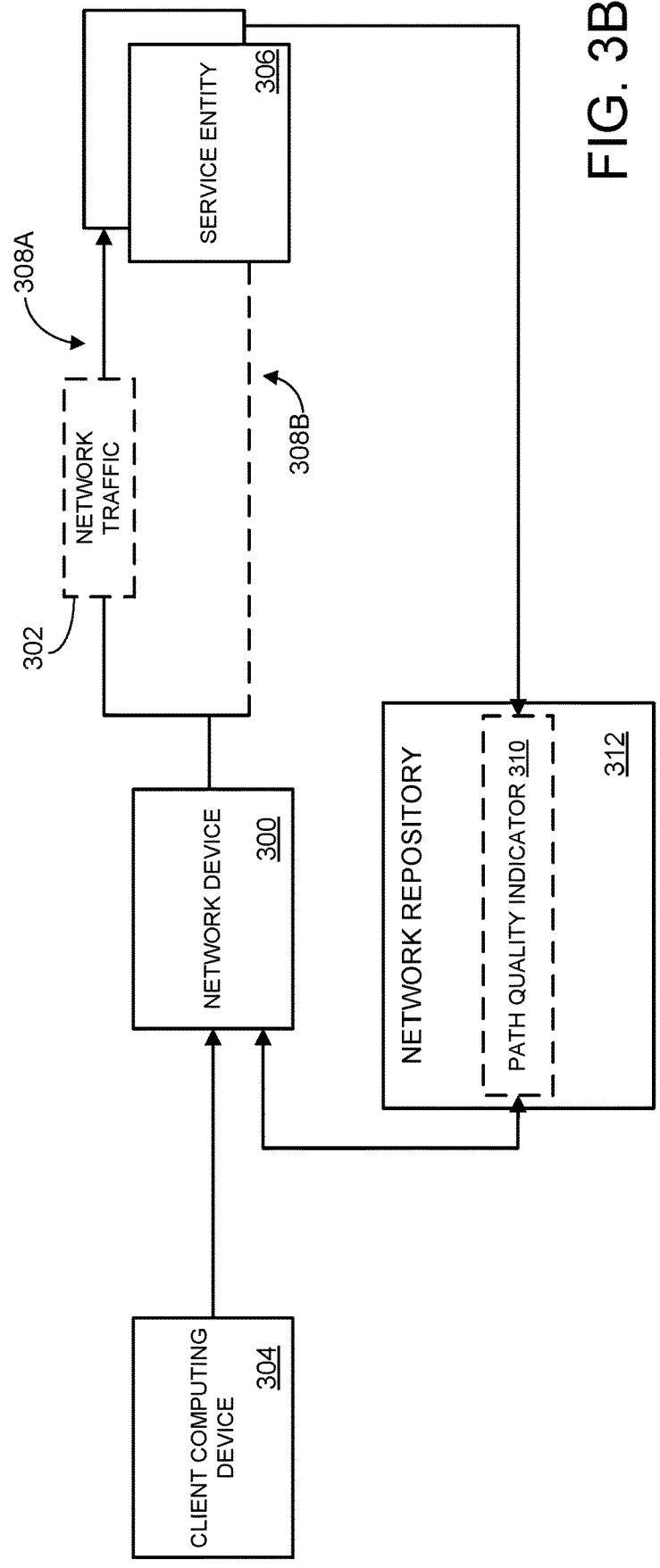

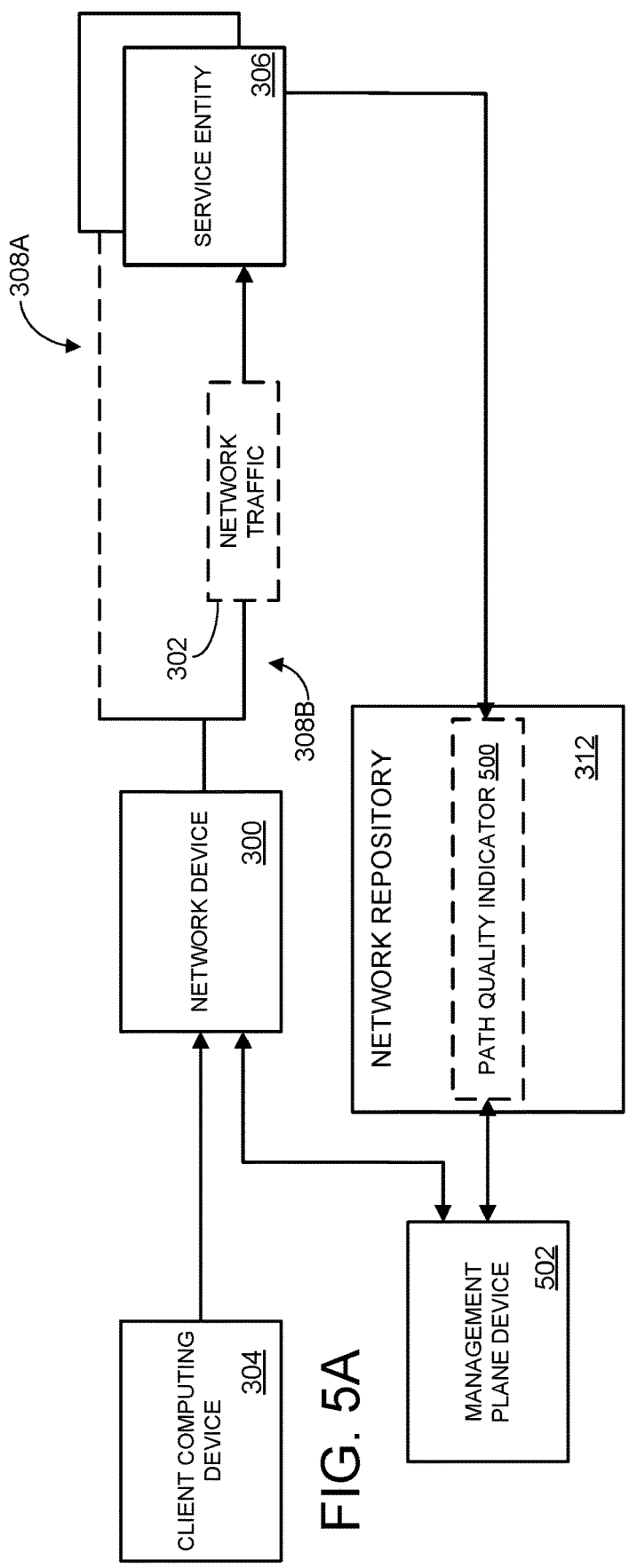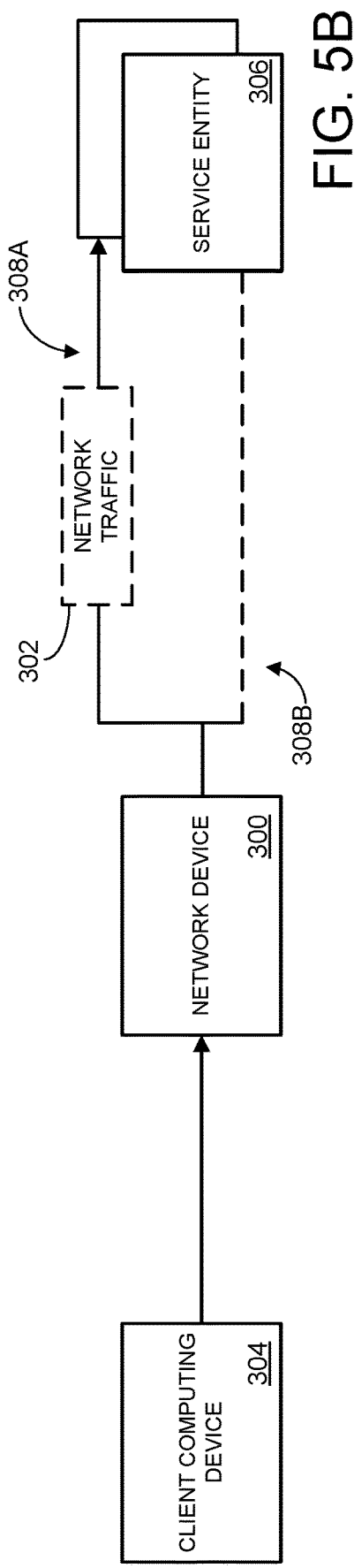

NETWORK PATH REDIRECTION

BACKGROUND

Data exchanged between two devices over a network may be relayed by any number of intermediate network devices. Depending on the specific network architecture, multiple potential network paths may be available for the network traffic. In other words, between the two network endpoints, there may be one or more network devices that have access to multiple paths over which they can direct network traffic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for directing network traffic includes, at a network device, receiving network traffic provided by one or more client computing devices. The network device directs the network traffic to a service entity over a first network path. A path quality indicator is received that indicates whether the network traffic directed over the first network path satisfies one or more experience criteria. Based at least on the path quality indicator indicating that the network traffic directed over the first network path does not satisfy the one or more experience criteria, the network device redirects some or all of the network traffic to the service entity over a second network path.

BRIEF DESCRIPTION OF THE DRAWINGS

FIGS. 3A-3C schematically illustrate redirection of network traffic from a first network path to a second network path.

FIGS. 5A and 5B schematically illustrate redirection of network traffic from a second network path back to a first network path.

DETAILED DESCRIPTION

Figure 1:
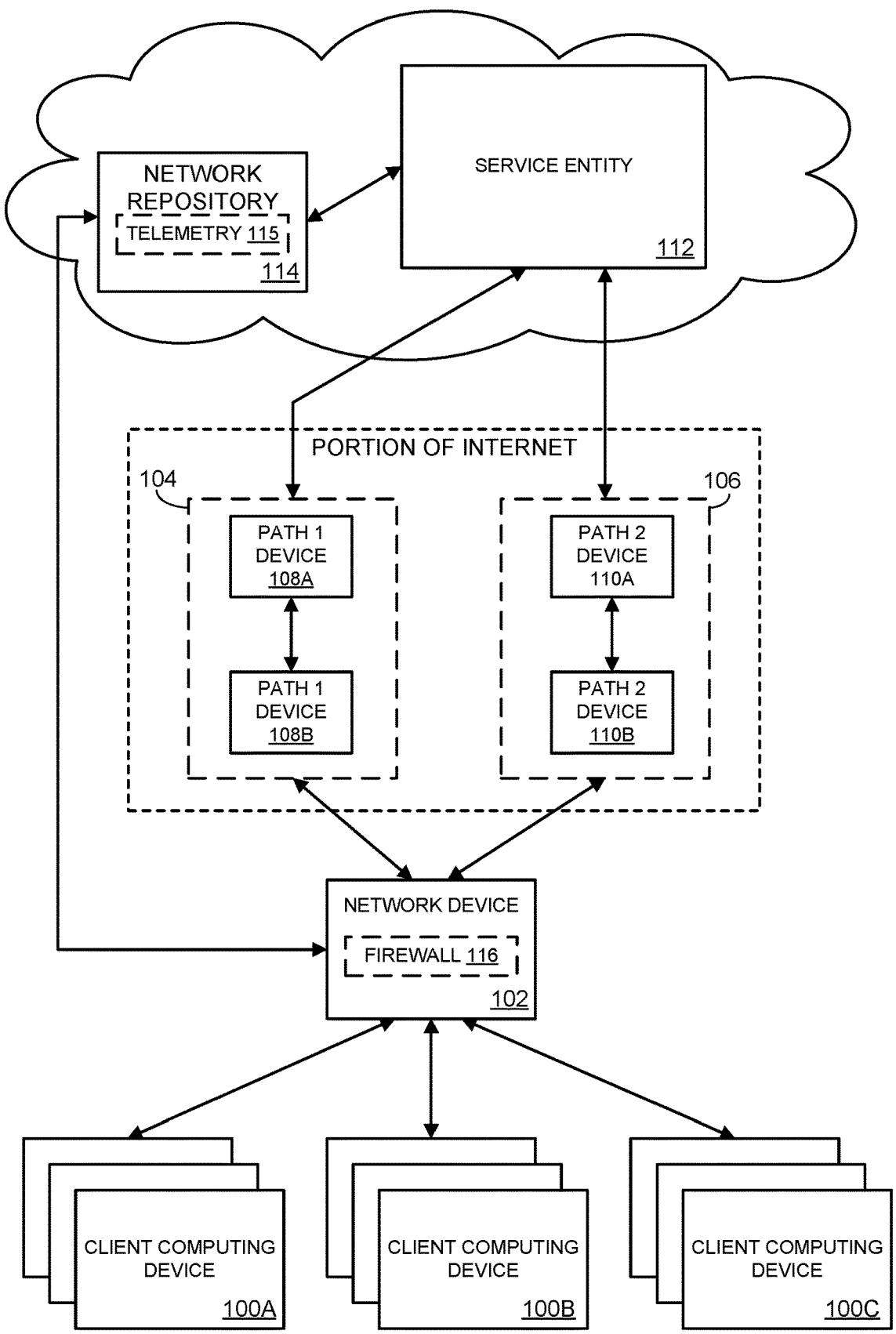
FIG. 1 schematically depicts exchange of network traffic between a service entity and a plurality of client computing devices.

As discussed above, data transmitted over a network may be directed over any number of different network paths. Such data may be encapsulated as network packets (e.g., UDP, TCP/IP packets). The amount of such data at any given time and/or the totality of such data over a particular period of time may be referred to as network traffic.

Network traffic may be routed between different sets of intermediate network devices when the data is transmitted over different network paths. For instance, a network device (e.g., router) may receive network traffic from one or more client devices and direct such traffic to a service entity—e.g., that provides a website, an office productivity suite, or other network-accessible service. Such traffic may be transmitted or relayed by a variety of different intermediate network devices—for example including network routers, relays, and switches controlled by one or more parties.

Depending on the specific circumstances under which the network traffic is transmitted, some potential network paths between two devices (e.g., a service entity and a network device) may provide a better client experience than others. For instance, depending on the type/quantity of data transmitted, the hardware capabilities of the intermediate network devices, current network load, etc., some network paths may provide slow, intermittent, or unstable connections, and this can negatively impact the client experience. While some network devices are configured to dynamically redirect network traffic to use a different path based on detecting that network performance is poor or unstable, such devices typically lack insight into the actual application experience of the client devices. Thus, situations may arise in which the client experience would be improved by sending some or all network traffic over a different network path, and yet the network device does not redirect the traffic due to insufficient information regarding the client experience. As will be described in more detail below, an application (e.g., implemented by the service entity) may evaluate how network conditions impact the client experience provided by the application, and via decision logic, output a signal indicating whether network traffic should be redirected to use a different network path, and how much of the traffic should be redirected.

In one example scenario, a plurality of client computing devices on a local network may send network traffic to a network device (e.g., branch router), which may then direct the network traffic to a service entity over the Internet. Due to unstable network conditions along the network path between the network device and service entity, the application experience of the client computing devices may be poor—e.g., due to latency or buffering. However, from the perspective of the network device relaying the network traffic to the service entity, network performance may appear to be adequate, as the requested content is reaching its intended destination. In other words, the relatively low-level network hardware has no insight into how current network conditions positively or negatively impact the current application experience. For instance, if the network device were to switch some or all of the network traffic over to a different network path, the overall client experience may potentially be improved—e.g., because the new network path is able to handle more bandwidth. In other words, the network device responsible for selecting network paths has limited information regarding the actual client experience, and this can lead to the network device not exploring alternative network paths that could potentially improve the client experience.

FIG. 1 schematically depicts a network environment in which network traffic is exchanged between a service entity and a plurality of client computing devices. Specifically, a plurality of client computing devices including devices 100A-100C each provide network traffic to a network device 102, which transmits the network traffic to a service entity 112. The network device may select a network path through the Internet over which the network traffic is directed to the service entity 112. Notably, in any case in which a network device receives feedback and/or redirects network traffic, such actions may actually be performed by management plane software associated with the network device or a separate management server. A "service entity" refers to a collection of one or more devices working cooperatively to provide a network-accessible application or service, and each of the one or more devices may be jointly owned/operated by the same company or organization. Thus, "service entity" as shown in FIG. 1 and other drawings described herein will refer to at least one hardware device, and will often include a plurality of hardware devices, including front end and back end servers. As a nonlimiting example, service entity 112 may include a server computer configured to provide streaming video, streaming game content, cloud-hosted data, and/or video conferencing. Client computing devices 100A-C may be virtually any type of computing device, including smart phones, tablets, personal computers, other server computers, virtual/augmented reality devices, or Internet-of-Things devices. In many cases, the client computing devices will be behind a firewall, or other mechanism that hides details of the client's internal network from the service entity. In the example of FIG. 1, the network device 102 provides a firewall 116.

Network device 102 may direct network traffic over either a first network path 104 or a second network path 106. Paths 104 and 106 collectively represent a select portion of the larger Internet. Notably, network device 102 may take the form of a network router, and may in some cases be owned or operated by the same party (e.g., company or organization) that maintains the client computing devices, which will typically be separate from the party that maintains the service entity. Each of these two network paths is provided by a plurality of intermediate network devices, specifically devices 108A and 108B for first network path 104, and devices 110A and 110B for second path 106. Depending on current network conditions, either first network path 104 or second network path 106 may enable faster, more efficient, more reliable, and/or less expensive data exchange between the service entity and network device 102, which may provide a correspondingly better application experience for client devices 100A-C. However, as discussed above, network device 102 may not always select an optimal network path to direct the network traffic over, due to a lack of information regarding the actual application performance experienced by the client computing devices.

Accordingly, the present disclosure is directed to techniques for redirecting network traffic. A network device—e.g., a network router such as device 102—may direct network traffic received from one or more client computing devices to a service entity over a first network path. While directing the network traffic over the first network path, the network device receives a path quality indicator that reflects whether a current client experience provided by the first network path satisfies one or more experience criteria. The path quality indicator may be received, for instance, from the service entity, accessed from a network repository, or obtained from another suitable source. For example, any or all of the service entity, client computing devices, and various network devices may contribute network telemetry 115 to a network repository 114, and such telemetry can include, or be used to generate, path quality indicators. Network device 102 may therefore receive path quality indicators from the network repository, either in response to a request from the network device, and/or path quality indicators (and/or other diagnostic data) may be pushed to network device 102. Regardless of the source of the path quality indicator, if the experience criteria are not satisfied, then the network device may redirect some or all of the network traffic over a second network path, which may provide for a better client experience than the first network path. In some cases, the path quality indicators may recommend a specific action for the network device to take—e.g., "redirect X % of traffic to an alternate path"—to reduce decision-making by the network device. Additionally, or alternatively, the path quality indicator may include diagnostic or telemetry data that can be analyzed and acted upon by the network device.

Notably, depending on how much information is available regarding the second network path, the application and/or network device may not know how the client experience will be impacted by redirecting the network traffic. Even if some signal is available regarding the current performance of the second network path, there will typically be a risk that suddenly sending more traffic over the second network path will negatively impact the performance of the second network path, and therefore negatively impact the application experience of the client devices. Thus, as used herein, "redirecting network traffic" need not involve redirecting all network traffic currently flowing over the first network path. Rather, in some examples, only a relatively small amount of network traffic may be redirected to use the second network path, and the client experience associated with the redirected traffic may be monitored to evaluate the second path's performance. The amount of traffic redirected may be governed, in some examples, by policy settings on the network device. Similar policy settings may govern when and if traffic redirection should be discontinued (e.g., because the first network path improves), or if all network traffic should be redirected. Additionally, or alternatively, the rate at which traffic is redirected may be determined or influenced by a cloud application implemented by the service entity—for instance, based on path quality indicators or action recommendations generated by the application and provided to the network device or a management plane device governing the network device.

It will be understood that the network devices and architecture shown in FIG. 1 are schematic and non-limiting. The physical devices associated with the service entity, network devices (e.g., devices 102, 108A/B, 110A/B), client computing devices, and any devices implementing the network repository may have any suitable hardware configuration and form factor. Any or all of the devices associated with the service entity, network devices, client computing devices, and network repository may in some cases be implemented as computing system 700 described below with respect to FIG. 7.

Typically, the service entity will provide some type of network-accessible application or other service. The client computing devices may be user computing devices (e.g., laptops, desktops, smartphones, tablets, augmented/mixed reality devices) and/or client routers, while the service entity may include one or more web servers, or any other network-accessible devices. The present disclosure primarily focuses on a scenario in which a network device is receiving network traffic from a plurality of client devices and sending such traffic to a service entity, although any number of client computing devices may be present, including only one. When multiple client computing devices are present, traffic sent to the network device by some of the client computing devices may be directed over a different network path than traffic from others of the client computing devices.

The network devices may be any suitable devices that enable, facilitate, or otherwise participate in the exchange of network traffic between the service entity and client computing devices. For instance, the network devices may be network routers, switches, modems, relays, or servers. It will be understood, however, that the network traffic redirection techniques described herein may be applied to any scenario in which two devices exchange data traffic over a network, and this disclosure is not limited to environments that include a service entity and a client device.

For simplicity, only two different network paths are shown, each network path including two intermediate network devices. However, in typical networks, any number of potential network paths may exist, each including any number of intermediate network devices. Furthermore, some network paths may have one or more intermediate network devices in common.

The client computing device, service entity, and network devices may communicate in any suitable way and over any suitable computer network, including local network(s) and/or wide area network(s) (e.g., the Internet). Any or all of the devices may communicate over wired connections and/or wireless connections. The network traffic between the client devices and service entity may take any suitable form, including any type and quantity of computer data, and may persist for any length of time. The network traffic may be bidirectional or unidirectional. As examples, the network traffic may include streaming digital media (e.g., audio and/or video), streaming game data, peer-to-peer data exchange, voice/video over IP (VoIP) calls, and/or any other type of network traffic. Such data may be sent using any suitable protocol (e.g., UDP, TCP/IP packets).

Figure 2:
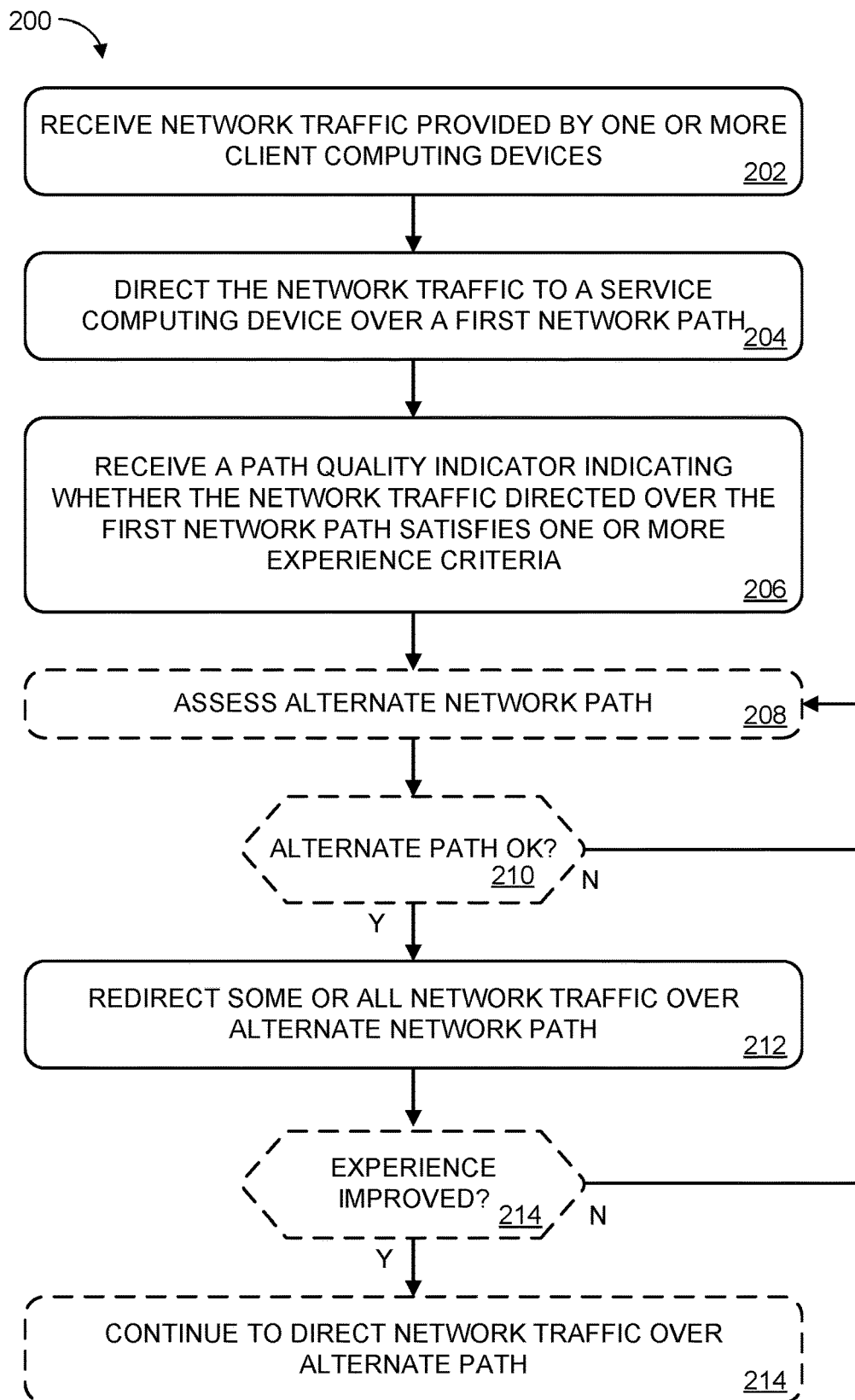
FIG. 2 illustrates an example method for directing network traffic.

FIG. 2 illustrates an example method 200 for redirecting network traffic. For example, as network traffic passes between a service entity and one or more client computing devices, learnings derived from the corresponding client experience can be used to generate a path quality indicator, which can serve as a signal to the network device for whether to redirect some or all of the network traffic to use a different path. Method 200 may be implemented by any device suitable for transmitting or relaying digital information over a computer network including, for example, network device 102 shown in FIG. 1. In some cases, method 200 may be implemented by computing system 700 described below with respect to FIG. 7.

At 202, method 200 includes receiving network traffic provided by one or more client computing devices. This is schematically illustrated in FIG. 3A, which shows an example network device 300 that receives network traffic 302 from a client computing device 304. As with the devices described above with respect to FIG. 1, all devices described with reference to FIGS. 3A-6 are schematic in nature and are provided as non-limiting examples. Any or all of the devices described with respect to FIGS. 3A-6 may be implemented as computing system 700 described below with respect to FIG. 7. Furthermore, any number of intermediate devices may be present between the network device and client device, and between the network device and service entity.

Furthermore, as discussed above, the network traffic received by the network device may include any type and quantity of data and may be received over any length of time. In one example scenario, the network device may be a router, while the client computing device is a user computing device, such as a desktop or laptop, and the service entity includes a web server configured to implement a network service or application. For instance, the network traffic may take the form of web traffic received by network device 300 from a plurality of client computing devices, each attempting to send traffic to the same service entity, and/or the network traffic may include any other computer data. As used herein, "receiving" network traffic may include traffic that is "pushed" to the network device, as well as traffic that is requested or "pulled" by the network device.

Returning briefly to FIG. 2, at 204, method 200 includes directing the network traffic to a service entity over a first network path. This is also schematically shown in FIG. 3A, in which network device 300 directs the network traffic 302 to a service entity 306 via a first network path 308A, illustrated as a solid line. A second potential network path 308B is illustrated as a dashed line to indicate that network traffic is not currently directed over the second network path. As discussed above, a service entity, such as service entity 306, refers to a collection of one or more devices working cooperatively to provide a network-accessible application or service, and each of the one or more devices may be jointly owned/operated by the same company or organization. In FIG. 3A, each of the two potential network paths lead to different devices associated with the service entity, which may include, for example, front end servers.

For the sake of simplicity, only one client computing device is shown in FIG. 3A. However, as with FIG. 1, network traffic from any number of client computing devices may be directed to a service entity by a network device. Furthermore, only two network paths are shown, although any number of potential network paths may be available between the network device and service entity, each of which may be implemented by any number of intermediate network devices.

Returning again to FIG. 2, at 206, method 200 includes receiving a path quality indicator indicating whether the network traffic directed over the first network path satisfies one or more experience criteria. This is illustrated in FIG. 3B, in which network device 300 receives a path quality indicator 310. Notably, the path quality indicator may be "received" in any suitable way, and "receiving" a path quality indicator may include accessing information that has been published by another device, such as a network repository 312. In other words, the network device, or a management plane associated with the device, may read a path quality indicator from the network repository and implement a policy change for the network device.

The path quality indicator may take any suitable form. In some cases, the path quality indicator may be a binary value—e.g., 0 or 1—expressing whether the current performance of the first network path does or does not satisfy the one or more experience criteria. Alternatively, the path quality indicator may take a non-binary form, such as a score out of 100, or a value between 0 and 1. The path indicator may be expressed as a request or include a recommended action, such as a recommendation to redirect some or all network traffic to use a different path. For example, the network device may redirect network traffic based on a path redirection request received from the service entity, the path redirection request generated based at least on a path quality indicator and one or more historical path quality indicators. The path redirection request may optionally specify a percent of total traffic intended for the service entity that should be redirected—e.g., 5%. In some cases, the path quality indicator may include diagnostic data provided by one or more devices facilitating or participating in the exchange of network traffic, and the network device may be configured to analyze or interpret the diagnostic data to determine whether to redirect the network traffic over a different network path. In some implementations, the path quality indicator may adhere to a predetermined schema and/or may aggregate information from multiple sources and/or across multiple times.

The path quality indicator may be received from any suitable source. In one example, the path quality indicator may be received from the service entity. In general, the service entity will determine, based on traffic coming down a particular network path, that a network problem is negatively impacting the client experience and send a path quality indicator indicating that traffic should be redirected.

In the example of FIG. 3B, the path quality indicator is accessed by the network device from a network repository 312, which may be configured to receive and maintain network telemetry data from any or all of the devices involved in a particular network communication. As discussed above, in any case in which a "device" is said to perform some function, the function may actually be performed by a management plane associated with the device, which may in some cases be implemented on a separate management server. In one example scenario, the path quality indicator may be generated by the service entity and transmitted to the network repository, as is shown in FIG. 3B, from which it may be accessed by the network device (or a management plane associated with the network device). At that point, a policy governing the network device may be changed, such that the network device directs some or all of the network traffic over a different network path. Alternatively, the service entity, network devices, and/or client computing device may provide diagnostic data to the network repository, which may derive the path quality indicator from the provided diagnostic data. As another example, the network device may retrieve the diagnostic data provided by the other devices from the network repository, and the network device may derive the path quality indicator based on this diagnostic data.

As discussed above, the path quality indicator indicates whether the network traffic directed over the first network path satisfies one or more experience criteria. Any number of such criteria may be used. As examples, the one or more experience criteria may include one or more of a detected network latency, reduced throughput for a file download, a detected network jitter, and a detected number of packet drops. These metrics may be measured at any suitable source—e.g., the service entity, intermediate network devices, and/or client computing device(s). The path quality indicator could reflect a recurring condition based on history that is addressed by proactive logic to shift traffic. In some cases, the experience criteria may be specific to a type of data included in the network traffic. For example, when the network traffic includes digital video, the one or more experience criteria may include one or both of a resolution and a framerate of the digital video. When the experience criteria are tracked by the service entity, the performance metrics may include requests transmitted by the plurality of client computing devices. For instance, when a majority of client computing devices are requesting low-resolution video, even when the service entity has the bandwidth to support high-resolution video, the service entity may determine that the performance of the current network path is insufficient. In general, any criteria may be used to evaluate the current performance of a network path. Such criteria may be tracked by any suitable device, and any suitable threshold may be used for determining that current client experience does not satisfy the experience criteria.

Furthermore, in some examples, the one or more experience criteria may include a comparison between a current network path and other potential network paths. Thus, a current network path may satisfy the one or more experience criteria even if the current client experience is relatively poor, for instance if the network device predicts (e.g., based on historical data) that switching to a different network path would provide even worse performance, or cause too significant of a disruption to current traffic. Additionally, or alternatively, the one or more experience criteria may include a predicted cost of switching away from the current network path. For instance, the network device may predict that switching from a first network path to a second network path would provide an overall better client experience but could also cause significant short-term disruptions to the client experience. Thus, any or all of a management plane of the network device, the network device itself, and the path quality indicator may, based on any or all known information about the first and second network paths, suggest when or if network traffic should be redirected. For instance, in some examples, the network device may determine that the current network path satisfies the one or more experience criteria, and opt not to redirect the network traffic at that time.

Figure 4:
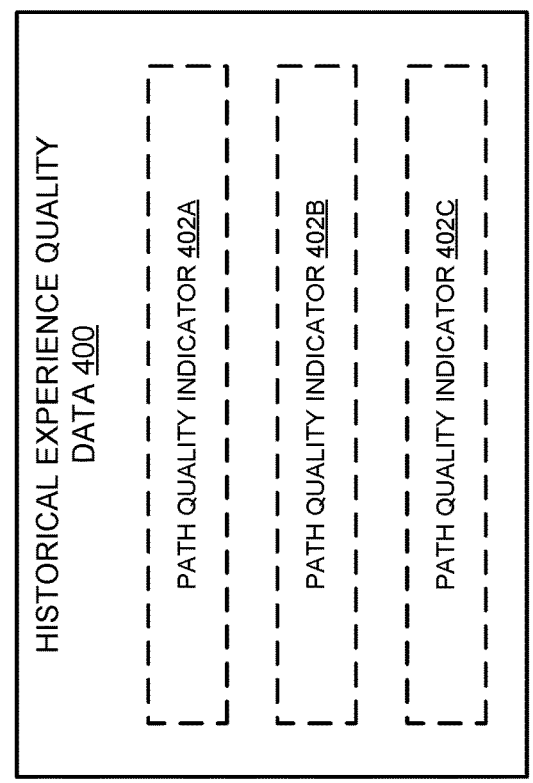
FIG. 4 schematically shows an example set of historical experience quality data.
Figure 6:
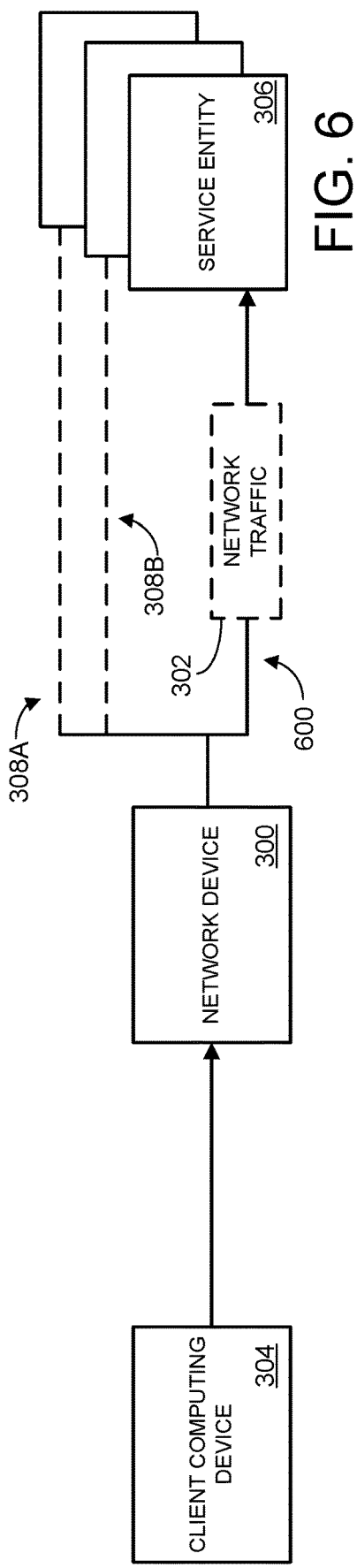
FIG. 6 schematically illustrates transmission of network traffic over a third network path.

In some cases, once a path quality indicator is received, the path quality indicator may be stored as part of a set of historical experience quality data. This is schematically illustrated in FIG. 4, which shows an example set of historical experience quality data 400, including multiple path quality indicators 402A-402C. These path quality indicators may be received at different times, from different sources, and/or correspond to different network paths. As will be described in more detail below, such historical data may in some cases be considered when determining when or if to redirect network traffic over a different network path.

Before redirecting network traffic to a service entity over an alternate network path, the network device may in some cases assess a current status or quality of the alternate path. Returning to FIG. 2, at 208, method 200 optionally includes assessing an alternate network path over which some or all network traffic may potentially be directed to a service entity. This may be done in any suitable way—e.g., via synthetic monitoring of the alternate path, or evaluation of any live traffic currently flowing between the network device and service entity over the alternate network path.

At 210, method 200 optionally includes determining whether the alternate path is suitable for sending network traffic to the service entity. If no, method 200 returns to 208, in which a different alternate network path is evaluated. This may repeat as many times as is necessary until a suitable alternate network path is identified, all potential network paths are exhausted, or conditions along the first network path improve such that traffic redirection is no longer desirable.

Figure 3C:
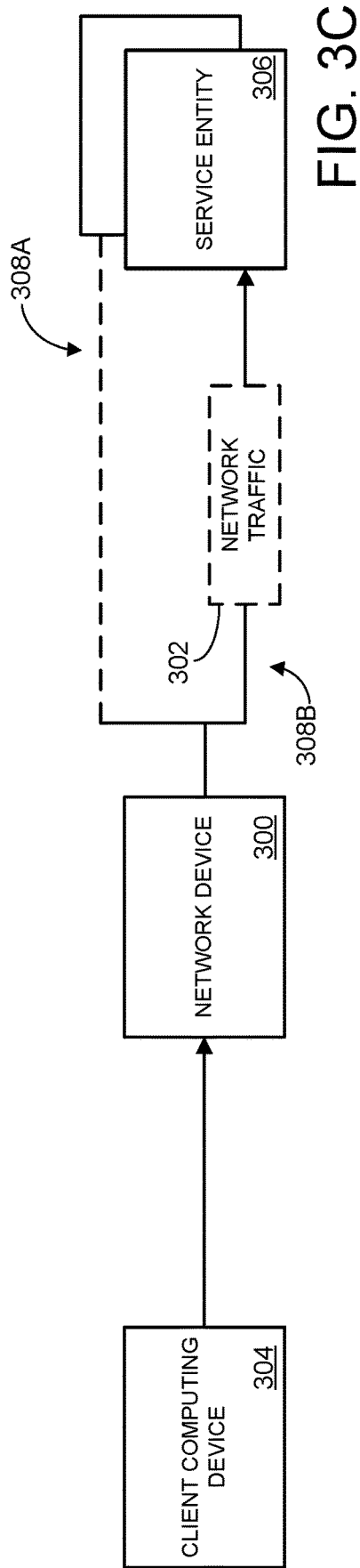

If yes, then at 212, method 200 includes, based at least on the path quality indicator indicating that the network traffic does not satisfy the one or more experience criteria, redirecting some or all of the network traffic to the client computing device over the second, alternate network path assessed at 208. This is illustrated in FIG. 3C, in which network device 300 has redirected some or all network traffic 302 from first network path 308A to second network path 308B. In other words, at least some of the network traffic that otherwise would have been transmitted using first network path 308A is transmitted or relayed by a different set of intermediate network devices using second network path 308B between network device 300 and service entity 306. It will be understood that the network device need not redirect all network traffic to the second network path. Rather, in cases where the network traffic is directed to a plurality of client computing devices, at least some of the network traffic may still be directed over the first network path.

Depending on current network conditions, redirecting some or all of the network traffic over the second network path may at least temporarily provide a better client experience than the first network path. However, depending on how network conditions change, and the type and quantity of network traffic received from the client computing devices, the improved performance provided by the second network path may not last indefinitely, or the second network path may provide a worse client experience than the first network path. Accordingly, over time, the network device may receive additional path quality indicators, which may be used as the basis for redirecting the network traffic away from the second network path. For example, while some or all of the network traffic is directed over the second network path, the network device may receive a second path quality indicator indicating that the second network path does not satisfy the one or more experience criteria.

For example, returning briefly to FIG. 2, at 214 method 200 optionally includes evaluating whether the client experience has improved as a result of redirecting some or all of the network traffic over the second network path. This may be done on the basis of a second path quality indicator provided by the service entity, as will be described in more detail below. If the client experience has not improved, the network device may again assess one or more other potential network paths at 208, and/or the network device may discontinue using the second network path and instead send the traffic over the first network path. If the client experience has improved, method 200 proceeds to 214, at which the network device continues to direct some or all of the network traffic over the second network path. In some cases, the network device may increase the portion of network traffic directed over the second network path over time. In general, at any time, the network device may reevaluate the network path(s) currently being used to send network traffic to the service entity, and redirect some or all network traffic over one or more alternate paths if available and desirable.

In some cases, the network device may receive path quality indicators on a periodic basis. For example, after receiving a first path quality indicator, the network device may receive a second path quality indicator after an indicator refresh interval. The indicator refresh indicator may be, as one example, 10 minutes, although other suitable intervals may be used.

If the second path quality indicator indicates that the network traffic directed over the second network path does not satisfy the one or more experience criteria, the network device may once again redirect the network traffic. As shown, feedback data from service entity 306 may be sent to network repository 312. Either before or after the feedback data is sent, it may be pushed through a pipeline for analysis and conversion into a second path quality indicator 500, which is stored by the network repository and reflects the quality of the client experience provided by second network path 308B. As discussed above with respect to FIGS. 3A-3C, the path quality indicator may in some cases be accessed directly by the network device. Alternatively, as is shown in FIG. 5A, the path quality indicator may be read by a separate management plane device, which may then change a policy of the network device based on contents of the path quality indicator.

Based on the second path quality indicator, some or all of the network traffic to the service entity may again be redirected—e.g., back over the first network path. This is schematically illustrated in FIGS. 5A and 5B. In FIG. 5A, network device 300 receives a second path quality indicator 500—e.g., either directly or via management plane device 502. In FIG. 5B, based on the second path quality indicator, the network device redirects some or all of the network traffic back over first network path 308A. This may be done, for instance, because the second path quality indicator indicates that the experience provided by the second network path does not satisfy the one or more experience criteria. In an alternative scenario, however, traffic may be redirected back to the first network path based on the path quality indicators no longer explicitly requesting that the network traffic be moved away from the first network path.

In other examples, however, network traffic may be redirected to use the first network path for reasons unrelated to the second path quality indicator. For instance, the network device may be configured to use the first network path by default, and the first path quality indicator may include a request to redirect the network traffic to use the second path. If the network device stops receiving requests to redirect the network traffic away from the first path, the network device may revert to its default and resume using the first network path.

In some cases, to reduce disruptions to the client experience, the network device may avoid redirecting network traffic over different network paths at greater than a threshold frequency, or unless there is a reasonable expectation that such redirection will improve the client experience. Accordingly, after redirecting the network traffic over the second network path, the network device may avoid again redirecting the network traffic until a threshold length of time has passed, or unless the network traffic directed over the second network path has a lower quality than when directed over the first network path. This may be determined, for instance, based on the second path quality indicator—e.g., when the second path quality indicator includes raw diagnostic data or a numerical evaluation of the current client experience. In cases where the path quality indicators are binary values, the network device may infer that performance of the second network path is worse than the first network path when a quantity of negative quality indicators received for the second network path exceeds the number of negative quality indicators received when the network traffic was directed over the first network path, or in another suitable manner.

In the example of FIGS. 5A and 5B, the network traffic is redirected from the second network path back over the first network path. However, as discussed above, any number of potential network paths may be available between the service entity and client computing device. For instance, in FIG. 6, network device 300 has redirected network traffic 302 from second network path 308B to a third network path 600, instead of first network path 308A. As with the first and second network paths, third network path 600 may include any number of intermediate network devices configured to transmit or relay the network traffic between network device 300 and service entity 306. Similarly, the network device may receive additional path quality indicators indicating whether the performance of the third network path satisfies the one or more experience criteria.

Thus far, the present disclosure has primarily focused on redirecting network traffic based on determining that a current client experience does not meet experience criteria. However, in other examples, historical experience quality data may also be considered when determining whether to redirect network traffic. For example, as discussed above with respect to FIG. 4, path quality indicators received from one or more sources may be stored in a set of historical experience quality data. Accordingly, when determining whether to redirect network traffic from one network path to another (e.g., from a first network path to a second network path), the network device may consider such historical experience quality data in addition to a most recently received path quality indicator.

For example, the path quality indicator may indicate that the current client experience provided by the first network path does not satisfy the one or more experience criteria. However, the set of historical experience quality data may indicate that, in previous instances, redirecting some or all of the network traffic to a second network path does not improve the client experience, and/or that performance of the first network path often improves as time passes. Thus, the network device may refrain from redirecting the network traffic away from the first network path.

Furthermore, historical experience quality data may be used as the basis for redirecting some or all of the network traffic preemptively, even when a most recently received path quality indicator indicates that the current client experience still satisfies the one or more experience criteria. As one example, the set of historical experience quality data may be used to predict that performance of a particular network path will decrease at a predicted time. The network device may therefore redirect the network traffic to use a different network path at or before the predicted time. Such analysis may be done in any suitable way and may in some cases rely on suitable machine learning (ML) or artificial intelligence (AI) techniques. Examples of suitable techniques will be given below with respect to FIG. 7.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
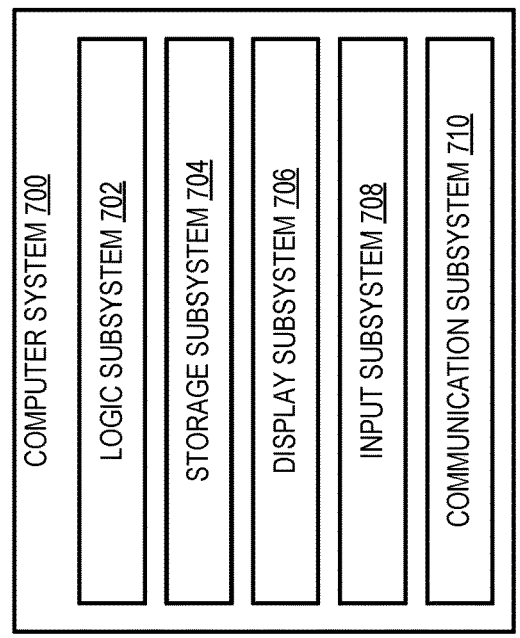
FIG. 7 schematically shows an example computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for directing network traffic comprises: at a network device, receiving network traffic provided by one or more client computing devices; directing the network traffic to a service entity over a first network path; receiving a path quality indicator indicating whether the network traffic directed over the first network path satisfies one or more experience criteria; and based at least on the path quality indicator indicating that the network traffic directed over the first network path does not satisfy the one or more experience criteria, redirecting some or all of the network traffic to the service entity over a second network path. In this example or any other example, the path quality indicator is provided by the service entity. In this example or any other example, the path quality indicator is received from a network repository. In this example or any other example, the path quality indicator received from the network repository is derived from information provided by one or both of the service entity and the one or more client computing devices. In this example or any other example, the method further comprises storing the path quality indicator in a set of historical experience quality data. In this example or any other example, some or all of the network traffic is redirected over the second network path based on a path redirection request received from the service entity, the path redirection request generated based at least on the path quality indicator and one or more historical path quality indicators included in the set of historical experience quality data. In this example or any other example, the method further comprises analyzing the set of historical experience quality data to predict that performance of the second network path will decrease at a predicted time, and redirecting some or all of the network traffic away from the second network path at or before the predicted time. In this example or any other example, the one or more experience criteria include one or more of a detected network latency, a detected network jitter, and a detected number of packet drops. In this example or any other example, the network traffic includes digital video, and the one or more experience criteria include one or both of a resolution and a framerate of the digital video. In this example or any other example, the method further comprises, after redirecting some or all of the network traffic over the second network path, receiving a second path quality indicator indicating that the network traffic directed over the second network path does not satisfy the one or more experience criteria, and redirecting some or all of the network traffic to the service entity over a third network path. In this example or any other example, the method further comprises, after redirecting some or all of the network traffic over the second network path, receiving a second path quality indicator indicating that the network traffic directed over the second network path does not satisfy the one or more experience criteria, and redirecting some or all of the network traffic to the service entity back over the first network path. In this example or any other example, some or all of the network traffic is redirected back over the first network path upon determining that the network traffic, when directed over the second network path, has a lower quality according to the second path quality indicator than when directed over the first network path. In this example or any other example, the method further comprises receiving a second path quality indicator after an indicator refresh interval. In this example or any other example, the indicator refresh interval is 10 minutes.

In an example, a network device comprises: a network communications interface configured to communicatively couple the network device with a service entity and one or more client computing devices; a logic machine; and a storage machine holding instructions executable by the logic machine to: receive network traffic provided by the one or more client computing devices; direct the network traffic to the service entity over a first network path; receive a path quality indicator indicating whether the network traffic directed over the first network path satisfies one or more experience criteria; and based at least on the path quality indicator indicating that the network traffic directed over the first network path does not satisfy the one or more experience criteria, redirect some or all of the network traffic to the service entity over a second network path. In this example or any other example, the one or more experience criteria include one or more of a detected network latency, a detected network jitter, and a detected number of packet drops. In this example or any other example, the instructions are further executable to, after redirecting some or all of the network traffic over the second network path, receive a second path quality indicator indicating that the network traffic directed over the second network path does not satisfy the one or more experience criteria, and redirect some or all of the network traffic to the service entity back over the first network path. In this example or any other example, the instructions are further executable to store the path quality indicator in a set of historical experience quality data, and some or all of the network traffic is redirected over the second network path based at least on the path quality indicator and one or more historical path quality indicators included in the set of historical experience quality data. In this example or any other example, the instructions are further executable to analyze the set of historical experience quality data to predict that performance of the second network path will decrease at a predicted time, and redirect some or all of the network traffic away from the second network path at or before the predicted time.

In an example, a method for directing network traffic comprises: at a network device, receiving network traffic provided by a plurality of client computing devices; directing the network traffic to a service entity over a first network path; receiving a path quality indicator provided by the service entity indicating whether the network traffic directed over the first network path satisfies one or more experience criteria maintained by the service entity; based at least on the path quality indicator indicating that the network traffic directed over the first network path does not satisfy the one or more experience criteria, redirecting some or all of the network traffic to the service entity over a second network path; receiving a second path quality indicator provided by the service entity indicating whether the network traffic directed over the second network path satisfies the one or more experience criteria maintained by the service entity; and based on determining that the network traffic, when directed over the second network path, has a lower quality according to the second path quality indicator than when directed over the first network path, redirecting some or all of the network traffic to the service entity back over the first network path.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for directing network traffic, the method comprising:
   at a network device, receiving network traffic provided by one or more client computing devices;
   directing the network traffic to a service entity over a first network path;
   receiving a path quality indicator indicating whether the network traffic directed over the first network path satisfies one or more experience criteria; and
   based at least on the path quality indicator indicating that the network traffic directed over the first network path does not satisfy the one or more experience criteria, redirecting some or all of the network traffic to the service entity over a second network path.

2. The method of claim 1, where the path quality indicator is provided by the service entity.

3. The method of claim 1, where the path quality indicator is received from a network repository.

4. The method of claim 3, where the path quality indicator received from the network repository is derived from information provided by one or both of the service entity and the one or more client computing devices.

5. The method of claim 1, further comprising storing the path quality indicator in a set of historical experience quality data.

6. The method of claim 5, where some or all of the network traffic is redirected over the second network path based on a path redirection request received from the service entity, the path redirection request generated based at least on the path quality indicator and one or more historical path quality indicators included in the set of historical experience quality data.

7. The method of claim 5, further comprising analyzing the set of historical experience quality data to predict that performance of the second network path will decrease at a predicted time, and redirecting some or all of the network traffic away from the second network path at or before the predicted time.

8. The method of claim 1, where the one or more experience criteria include one or more of a detected network latency, a detected network jitter, and a detected number of packet drops.

9. The method of claim 1, where the network traffic includes digital video, and the one or more experience criteria include one or both of a resolution and a framerate of the digital video.

10. The method of claim 1, further comprising, after redirecting some or all of the network traffic over the second network path, receiving a second path quality indicator indicating that the network traffic directed over the second network path does not satisfy the one or more experience criteria, and redirecting some or all of the network traffic to the service entity over a third network path.

11. The method of claim 1, further comprising, after redirecting some or all of the network traffic over the second network path, receiving a second path quality indicator indicating that the network traffic directed over the second network path does not satisfy the one or more experience criteria, and redirecting some or all of the network traffic to the service entity back over the first network path.

12. The method of claim 11, where some or all of the network traffic is redirected back over the first network path upon determining that the network traffic, when directed over the second network path, has a lower quality according to the second path quality indicator than when directed over the first network path.

13. The method of claim 1, further comprising receiving a second path quality indicator after an indicator refresh interval.

14. The method of claim 10, where the indicator refresh interval is 10 minutes.

15. A network device, comprising:
a network communications interface configured to communicatively couple the network device with a service entity and one or more client computing devices;
a logic machine; and
a storage machine holding instructions executable by the logic machine to:
receive network traffic provided by the one or more client computing devices;
direct the network traffic to the service entity over a first network path;
receive a path quality indicator indicating whether the network traffic directed over the first network path satisfies one or more experience criteria; and
based at least on the path quality indicator indicating that the network traffic directed over the first network path does not satisfy the one or more experience criteria, redirect some or all of the network traffic to the service entity over a second network path.

16. The network device of claim 15, where the one or more experience criteria include one or more of a detected network latency, a detected network jitter, and a detected number of packet drops.

17. The network device of claim 15, where the instructions are further executable to, after redirecting some or all of the network traffic over the second network path, receive a second path quality indicator indicating that the network traffic directed over the second network path does not satisfy the one or more experience criteria, and redirect some or all of the network traffic to the service entity back over the first network path.

18. The network device of claim 15, where the instructions are further executable to store the path quality indicator in a set of historical experience quality data, and where some or all of the network traffic is redirected over the second network path based at least on the path quality indicator and one or more historical path quality indicators included in the set of historical experience quality data.

19. The network device of claim 18, where the instructions are further executable to analyze the set of historical experience quality data to predict that performance of the second network path will decrease at a predicted time, and redirect some or all of the network traffic away from the second network path at or before the predicted time.

20. A method for directing network traffic, the method comprising:
at a network device, receiving network traffic provided by a plurality of client computing devices;
directing the network traffic to a service entity over a first network path;
receiving a path quality indicator provided by the service entity indicating whether the network traffic directed over the first network path satisfies one or more experience criteria maintained by the service entity;
based at least on the path quality indicator indicating that the network traffic directed over the first network path does not satisfy the one or more experience criteria, redirecting some or all of the network traffic to the service entity over a second network path;
receiving a second path quality indicator provided by the service entity indicating whether the network traffic directed over the second network path satisfies the one or more experience criteria maintained by the service entity; and
based on determining that the network traffic, when directed over the second network path, has a lower quality according to the second path quality indicator than when directed over the first network path, redirecting some or all of the network traffic to the service entity back over the first network path.

* * * * *